(12) United States Patent
van den Berg et al.

(10) Patent No.: US 9,729,566 B2
(45) Date of Patent: *Aug. 8, 2017

(54) SYSTEM AND METHOD FOR DETECTING AND EVICTING MALICIOUS VEHICLES IN A VEHICLE COMMUNICATIONS NETWORK

(71) Applicant: Vencore Lab, Inc., Basking Ridge, NJ (US)

(72) Inventors: Eric van den Berg, Basking Ridge, NJ (US); Tao Zhang, Basking Ridge, NJ (US)

(73) Assignee: Vencore Labs, Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/575,793

(22) Filed: Dec. 18, 2014

(65) Prior Publication Data
US 2015/0156215 A1 Jun. 4, 2015

Related U.S. Application Data

(63) Continuation of application No. 12/872,569, filed on Aug. 31, 2010, now Pat. No. 8,973,129.
(Continued)

(51) Int. Cl.
H04L 29/06 (2006.01)
H04W 4/04 (2009.01)
(Continued)

(52) U.S. Cl.
CPC ........ *H04L 63/1425* (2013.01); *H04L 9/3268* (2013.01); *H04L 63/20* (2013.01);
(Continued)

(58) Field of Classification Search
None
See application file for complete search history.

(56) References Cited

U.S. PATENT DOCUMENTS 6,249,232 B1 * 6/2001 Tamura et al. ............... 340/902
8,973,129 B2    3/2015 van den Berg et al.
(Continued)

FOREIGN PATENT DOCUMENTS

WO  WO2008115984  9/2008
WO  WO2011026092  3/2011

OTHER PUBLICATIONS

Braverman, Mark et al., "MAfia: A Theoretical Study of Players and Coalitions in a Partial Information Environment," The Annals of Applied Probability, 2008, pp. 1-23.
(Continued)

*Primary Examiner* — David Le
(74) *Attorney, Agent, or Firm* — Heslin Rothenberg Farley & Mesiti P.C.

(57) ABSTRACT

In a vehicle communication network, some vehicles may be used by attackers to send false information to other vehicles which may jeopardize the safety of other vehicles. Vehicles should be able to detect malicious communications activities and to mitigate the impact of malicious vehicles by evicting (eliminating) suspected malicious vehicles from the system. Evicting a vehicle is to ignore the messages sent from the vehicle for a specified time period. Voting and sacrifice principles are combined using a mathematical model based on the "Mafia Game". The Mafia Game model focuses on the relative size of the group of attackers within a neighborhood necessary to dominate the entire network in the neighborhood (i.e., to eventually evict all the innocent vehicles).

20 Claims, 2 Drawing Sheets

Related U.S. Application Data

(60) Provisional application No. 61/238,681, filed on Aug. 31, 2009.

(51) Int. Cl.
| | | |
|---|---|---|
| *H04W 4/20* | (2009.01) | |
| *H04W 12/04* | (2009.01) | |
| *H04L 9/32* | (2006.01) | |
| *H04L 29/08* | (2006.01) | |
| *H04W 12/12* | (2009.01) | |

(52) U.S. Cl.
CPC ............ *H04L 67/12* (2013.01); *H04W 4/046* (2013.01); *H04W 4/20* (2013.01); *H04W 12/04* (2013.01); *H04W 12/12* (2013.01)

(56) References Cited

U.S. PATENT DOCUMENTS

| | | | | |
|---|---|---|---|---|
| 2006/0225135 | A1* | 10/2006 | Cheng et al. | 726/26 |
| 2008/0103649 | A1* | 5/2008 | Shen et al. | 701/23 |
| 2008/0189788 | A1 | 8/2008 | Bahl | |
| 2010/0201543 | A1 | 8/2010 | Shorey et al. | |

OTHER PUBLICATIONS

Moore, Tyler et al., "Fast Exclusion of Errant Devices from Vehicular Networks," Sensor Mesh and Ad Hoc Communications and Network, 2008, pp. 1-9.
Sood, V. et al., "Voter Models on Heterogeneous Networks," Phys. Rev. E, Apr. 22, 2006, pp. 1-14.
Maxim Raya et al., "Securing Vehicular Communications", IEEE Wireless Communications, Oct. 2006, pp. 8-15.
Supplementary European Search Report, EP 10812746, Dated Apr. 15, 2015.
International Search Report, International Application No. PCT/US2010/047293, dated Oct. 26, 2010.
Written Opinion, International Application No. PCT/US2010/047293, dated Oct. 26, 2010.
International Preliminary Report on Patentability, International Application No. PCT/US2010/047293, dated Aug. 10, 2011.

* cited by examiner

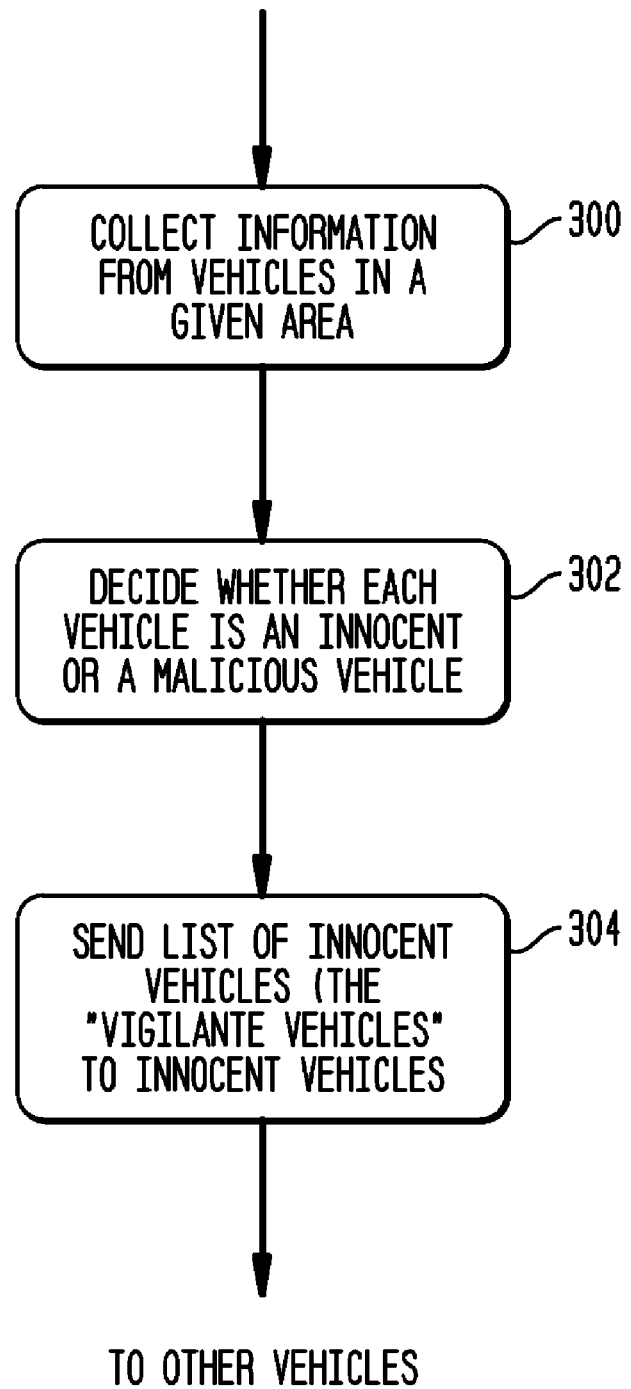

SYSTEM AND METHOD FOR DETECTING AND EVICTING MALICIOUS VEHICLES IN A VEHICLE COMMUNICATIONS NETWORK

CROSS-REFERENCE TO RELATED APPLICATIONS

This application is a continuation of U.S. patent application Ser. No. 12/872,569 filed on Aug. 31, 2010, entitled "System and Method for Detecting and Evicting Malicious Vehicles in a Vehicle Communications Network," which claims the benefit of U.S. Provisional Application No. 61/238,681, filed on Aug. 31, 2009, the entire disclosures of which are incorporated herein in their entirety.

FIELD OF THE INVENTION

The present invention relates to malicious behavior detection and malicious vehicle detection in a vehicle communications network.

BACKGROUND OF THE INVENTION

Agents interested in malicious behaviors include all entities that may engage in such behaviors and/or profit from it. These agents are grouped into three categories according to the amount of resources they may have to cause harm to the vehicular network:

The first category of attackers are solitary attackers who mainly operate on their own. They have limited monetary resources and use the Internet as their main source of information. Examples of attackers in this category include: Unscrupulous or opportunistic individuals; Computer hackers; Automotive, electronic, or computer hobbyists; and Very loosely organized groups.

The second category of attackers are typically one or more groups of individuals who are moderately coordinated, communicate on a regular basis, have moderate resources, can obtain information not publicly known or available. Examples of attackers in this category include: Corrupt Insiders and Unscrupulous Businesses.

The third category of attackers are highly organized, have access to expansive resources, can infiltrate organizations and obtain closely held secrets, may consider life and individuals expendable to achieve their goals, and may be supported by governing bodies of foreign nations. Examples of attackers in this category include: Organized Crime and Foreign nations.

Some of the potential motivations that may drive agents to exhibit malicious behaviors within a vehicular network, in an order of increasing impact, are: Sadistic pleasure in harming other vehicles or the entire vehicular network; Preferential treatment from the vehicular network for the purposes of evading law enforcement, assisting in criminal operations, or diverting attention from a primary attack; Prestige in a successful hack or a new virus launch; Manipulate traffic authority decisions; Acquiring personal advantages in driving conditions or economic gain; e.g., committing insurance fraud or car theft; Promote national, political, and special interests; and Civil, political and economic disruption, including warfare.

Security attacks and malicious behaviors based on communications activities in a vehicle-to vehicle (V2V) communications environment can be categorized as follows:

1) Attackers could modify the communication content coming from their vehicles' software or hardware, including: inaccurate traffic conditions, including false warnings related to forward collisions, blind spot situations, lane changes, unsafe passing; and inaccurate driving conditions or patterns, such as false statements about speeds, braking, directions, positions, and intersection movement.

2) Attackers could modify the communication functionalities of their vehicles' software or hardware to carry out attacks, such as one of the attacks above and the following: modifying transmission timing intervals of messages; delaying the delivery of messages; sending more messages than the vehicle is designed to; not sending messages for a long enough time interval; and disabling the functioning of a vehicle's software, say, because of privacy concerns. Attackers could attempt to impersonate vehicles or other network entities (e.g., servers) to cause harm to the vehicular network operations. Attackers could act as intruders and attempt to use data stored on vehicles or other network entities (e.g., servers) to cause harm to the vehicular network operations.

In order to ensure safe and secure operation of a vehicle communications system, malicious use of the certificates to cause harm to the vehicles networks and applications need to be detected so that these certificates can be revoked. Malicious vehicles used to cause significant harm to the vehicle networks and applications need to be detected and "evicted" from the vehicle communications network. If vehicles have frequent infrastructure network connectivity, they can rely on trusted servers in the infrastructure network to detect and respond to security threats. These infrastructure servers could collect information from a large number of vehicles and have sufficient processing capabilities to analyze the data to detect malicious activities. However, when vehicles have sporadic or zero infrastructure connectivity along the roads, attackers could perform attacks without being monitored by any highly trusted entities such as infrastructure servers. Vehicles can no longer rely on any infrastructure-based servers to help detect malicious activities. As a result, attacks will have much higher chances to be successful, and attackers would have a much higher chance of being undetected. Vehicles would have to rely on themselves and interactions with other potentially untrusted vehicles to detect malicious activities and mitigate their impacts.

In V2V communications, particularly with no infrastructure network support, it is essential for the vehicles to be able to rely on themselves and distributed techniques to detect malicious communications activities and to mitigate the impact of malicious vehicles by evicting (or eliminating) suspected malicious vehicle from the system (i.e., to ignore the messages sent from the suspected malicious vehicle). Such a capability allows the vehicles to communicate securely without being excessively impacted by malicious activities without relying on infrastructure network connectivity.

Several approaches exist in the prior art in which vehicles decide locally whether or not to evict a suspected malicious vehicle from the system. Two methods have recently been considered for V2V vehicular communications networks are: voting mechanisms, and 'Sacrifice' by individual vehicles, in which a suspected device is evicted together with its 'accuser'. (This is also sometimes termed "suicide for the common good").

In a voting mechanism, such as LEAVE described by T. Moore et al. "Fast exclusion of errant devices from vehicular networks", Proceedings IEEE SECON, San Francisco, Calif., Jun. 16-20, 2008, vehicles vote by exchanging signed claims of impropriety of another vehicle. Each vehicle then adds these warning messages to its 'accusation list'. Once the warning votes against a vehicle exceed a threshold, the accused vehicle is placed on a 'blacklist', similar to a local or temporary certificate revocation list (CRL). For nodes which are placed on the blacklist, additional 'disregard this vehicle' messages will be broadcast to other vehicles. Typically, the majority vote principle is used to decide when to deem another vehicle untrustworthy and to send a warning message about this untrusted vehicle.

A majority vote detection mechanism relies on an 'honest majority': every node must have more good neighbors than bad. Therefore, local communication graph structure can have a significant effect on the dynamics of the voter model, see, e.g., V. Sood, T. Antal, S. Redner, "Voter models on heterogeneous networks", Phys. Rev. E, April 2008. Bad nodes can eliminate good nodes if they form a local majority. Good nodes can eliminate bad nodes if they have a local majority. Specifically, they can send sufficiently many 'warning' and/or 'disregard' messages in LEAVE, for example.

For V2V communications, consider the following threat model: attackers can disseminate false messages and abuse the elimination mechanism. Furthermore, multiple attackers can collude.

In a 'sacrifice' based model, any vehicle can evict any other vehicle by simultaneously agreeing to limit its own participation in future V2V communications hence giving his decision more credibility. Therefore, in this scheme it is easier to evict a node than in a vote-based mechanism where a majority votes from multiple vehicles are used to decide whether to evict a vehicle. However, abuse of this mechanism is made more costly by forcing simultaneous removal of the accuser: 'Disregard' messages by an accuser cause simultaneous disregard of both the suspected node and its accuser.

The prior art fails to address how to determine how many malicious vehicles can the vehicle network tolerate before the innocent vehicles loss their ability to detect and evict malicious vehicles. The present invention has a provable bound on the number of malicious vehicles the system can tolerate before the system loses its ability to detect and evict malicious vehicles. This is important for determining how long the malicious detection and eviction method can continue to run before it has to rely on other means, such as communications with infrastructure-based intrusion detection systems, to eliminate the malicious vehicles.

SUMMARY OF THE INVENTION

The present invention provides an approach that combines the vote and the sacrifice principles using a mathematical model called the "Mafia Game". The Mafia Game model focuses on the relative size of the group of attackers within a neighborhood necessary to dominate the entire network in the neighborhood (i.e., to eventually evict all the innocent vehicles). This combined approach does not lead to a false decision probability which the vote and the sacrifice mechanisms have to address. Furthermore, a low level of mobile or fixed infrastructure network connectivity could significantly increase the performance of the proposed approach.

In a vehicle communication network, some vehicles may be used by attackers to send false information to other vehicles which may jeopardize the safety of other vehicles. For example, a malicious vehicle may broadcast erroneous emergency break light messages to cause neighboring vehicles to think the malicious vehicle is breaking hard so the other vehicles will also have to reduce their speeds suddenly, which may cause accidents.

Vehicles should be able to detect malicious communications activities and to mitigate the impact of malicious vehicles by evicting (eliminating) suspected malicious vehicles from the system. Evicting a vehicle is to ignore the messages sent from the vehicle for a specified time period.

Such malicious behavior detection and mitigation methods can allow vehicles to communicate securely without being excessively impacted by malicious activities without relying on infrastructure network connectivity.

The present invention combines the voting and the sacrifice principles using a mathematical model based on the "Mafia Game". The Mafia Game model focuses on the relative size of the group of attackers within a neighborhood necessary to dominate the entire network in the neighborhood (i.e., to eventually evict all the innocent vehicles). This combined approach does not need to a false decision probability which the vote and the sacrifice mechanisms have to address. Furthermore, a low level of mobile or fixed infrastructure network connectivity could significantly increase the performance of the proposed approach.

The method for detecting and evicting malicious vehicles enables vehicles to have secure communications for significantly longer time, compared to prior art PKI solutions, before having to communicate with Certificate Authorities and therefore significantly reducing reliance on roadside infrastructure networks. This translates to a significantly small number of roadside network access points (base stations) that will be required to support the PKI operations for V2V communications, hence significantly reducing the costs of system deployment.

The proposed method has a provable bound on the number of malicious vehicles the system can tolerate before the system loses its ability to detect and evict malicious vehicles.

Connecting Mafia Game Theory to designing a practical PKI solution for V2V communications has not been described elsewhere.

The present invention will be better understood when the following description is read in conjunction with the accompanying drawings.

BRIEF DESCRIPTION OF THE DRAWINGS

FIG. 3 is a flow chart of actions by detective vehicles.

DETAILED DESCRIPTION

Figure 1:
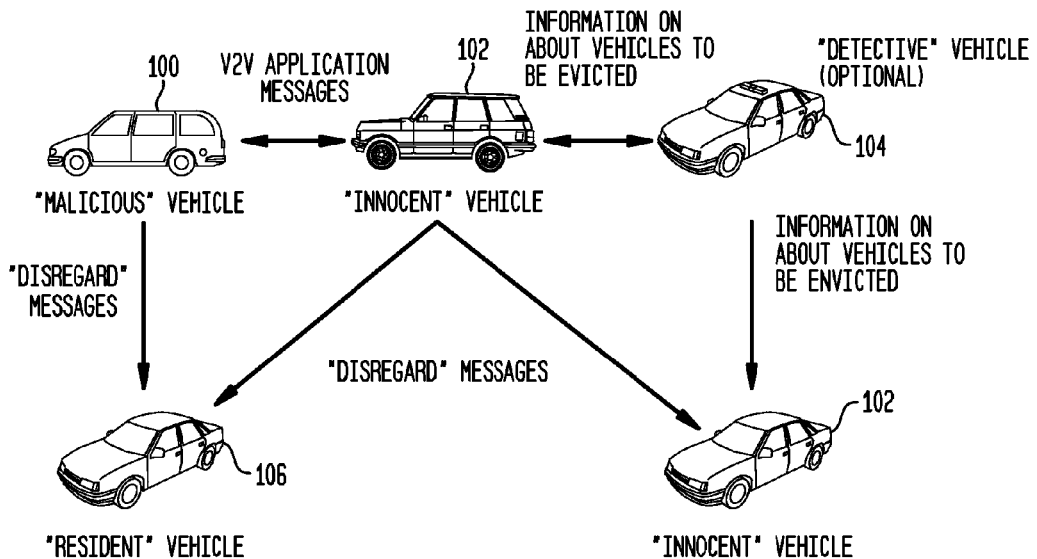
FIG. 1 shows a system architecture for the invention.

As shown in the system architecture in FIG. 1, vehicles are classified into the following categories:

Malicious (Mafia) vehicles 100 are vehicles that have been detected to behave significantly differently from the behaviors designed by the vehicle manufacturers. Malicious vehicles are assumed to have full knowledge of who the other malicious vehicles in a neighborhood are. That is, collusion among malicious vehicles is possible. Through collusion, "Malicious" vehicles can create a local majority to eliminate a non-Malicious vehicle. "Malicious" vehicles can adapt their behaviors to that of Innocent vehicles so that they can postpone detection. In other words, they do not have to behave malicious all the time.

Innocent vehicles 102 are vehicles that behave as designed by the vehicle manufacturers.

Detective vehicles 104 are innocent vehicles that have the ability to detect whether another vehicle is innocent or malicious.

Vigilante vehicles are vehicles deemed/verified by the detective vehicles as innocent vehicles.

Resident vehicles 106 are vehicles of all categories combined in a given region or neighborhood.

Figure 2:
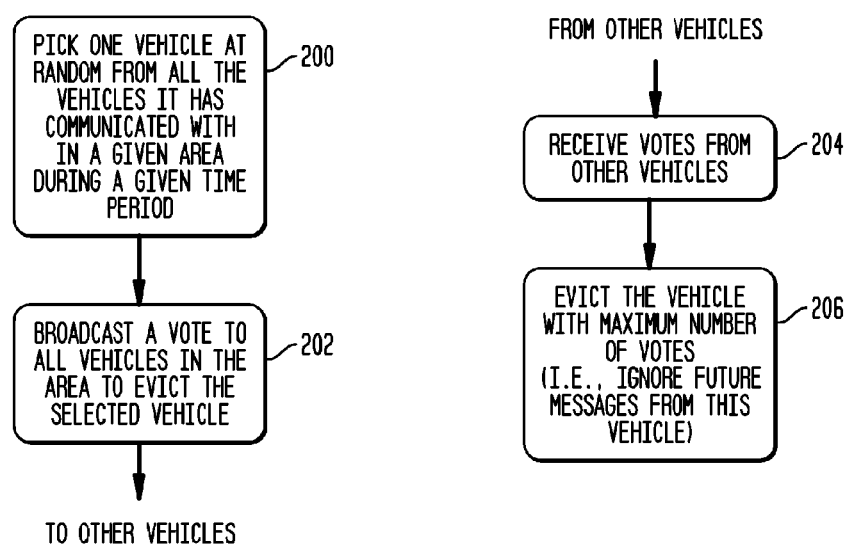
FIG. 2 is a flow chart of actions taken by innocent vehicles.

Applying the Mafia Game model to a V2V communications network, the vehicles can be viewed to be playing a game consisting of the following iterations or rounds:

1) Resident vehicles' Turn: Referring to FIG. 2, all Resident vehicles pick a vehicle to eliminate by majority vote 200. Each resident vehicle votes 202 to eliminate one vehicle. The votes from the Resident vehicles are received by the other vehicles 204. The vehicle receiving the most votes is then eliminated 206. In case of a tie, a vehicle is chosen uniformly at random from the vehicles receiving the maximum number of votes. The identity of the eliminated vehicle is revealed publicly via dissemination of a "Disregard" message.

2) Malicious vehicles' Turn: Malicious vehicles choose an innocent vehicle to eliminate. The only information announced publicly by the malicious vehicles will be the identity of the vehicle eliminated and whether it was a detective vehicle or not. Again, the result can be disseminated via a "Disregard" message.

3) Detective's Turn (if there are detective vehicles): Each detective vehicle acquires the Malicious or Innocent status of a vehicle. This status is then revealed only to the Detective vehicles. Detectives, for instance, can be police vehicles. Here, the Detective vehicle may collect messages from other vehicles and may communicate with infrastructure-based servers to help determine whether another vehicle is malicious or not.

After round t, there are $R_t=R-2t$ Resident vehicles in the system. And the Mafia Game has two possible outcomes:

The "Innocent" vehicles win if all "Mafia" vehicles have been eliminated and there are still "Innocent" vehicles alive.

The "Mafia" vehicles win if all "Innocent" vehicles have been eliminated when there are still "Mafia" vehicles alive.

Next, here are analysis results on the performance of the scheme. For analysis purpose, the following assumptions are made:

a) In the game without "Detective" vehicles, assume that all "Resident" vehicles can send a message to all other Resident vehicles simultaneously. This is primarily to assure later votes are not influenced by earlier ones. Otherwise, Mafia vehicles may be able to influence the majority vote in the all-vehicle Residents round, to eliminate an Innocent vehicle with greater likelihood. This can be achieved using cryptographic protocols, for example.

b) In the game with Detectives, we assume that Residents can vote anonymously and the Residents can securely exchange messages, e.g. using a PKI system, with anonymized certificates.

The anonymous vote is used to coordinate votes of the Vigilante vehicles with the other (at least the Innocent) vehicles. Each Resident vehicle still announces its vote in a plurality vote. The anonymous vote is necessary to keep the identity of Vigilante vehicles unknown to non-Vigilante vehicles, in particular, unknown to Mafia vehicles. In this sense, the Vigilante vehicles are indeed an 'Anti-Mafia'. The cryptographic assumptions, in particular the anonymous pre-communication round, can be removed, if there are a simple majority of Vigilante vehicles among the Resident vehicles. This is easier to achieve when there are multiple, say d detectives: In particular, for any $\epsilon>0$, there is a d such that d detectives have a probability of winning of at least $1-\epsilon$ against a mafia of size $(\frac{1}{2}-\epsilon)$ R.

Now it will be shown that voting will take a bounded number of sub-rounds that is polynomial in the number of "Resident" vehicles. This assumption can be satisfied even if the vehicles' votes need to be propagated over several hops, i.e., when not all vehicles are within one-hop broadcast range with each other. Furthermore, the number of computational steps each vehicle can take between rounds is also bounded by a polynomial in the number of residents.

The optimal strategies in the game without detectives are given as follows:

Innocent Vehicle's Optimal Strategy: In iteration t, each "Resident" vehicle $1 \le s \le R_t$ picks a random vehicle to eliminate. As long as the "Innocent" vehicles have the majority in each Residents round, a random resident vehicle will be eliminated.

Malicious Vehicle's Optimal Strategy: As long as the "Innocent" vehicles have the majority, the "Mafia" vehicles may as well follow the same strategy of choosing a random innocent in each Residents round.

The following results about a network with R Resident vehicles can be derived based on analysis related to the Mafia Games:

In the game without Detectives: Malicious vehicles will surely lose if the number of them is lower than the order of $\sqrt{R}$, have a comparable chance of winning if the number of them is in the order of $\sqrt{R}$, and win if the number of them is larger than order $\sqrt{R}$.

In the game with $d \ge 1$ Detectives, The probability of the Malicious vehicles winning is only comparable to the Innocent's winning when there are at least $\eta R$ Malicious vehicles, for some constant $\eta$ that satisfies $0 < \eta \le 1$.

The above results provide several significant insights that provide a solid foundation for designing a V2V security system without roadside infrastructure networks. These insights include, for example, if it is possible to design a malicious vehicle detection and eviction approach so the number of malicious vehicles is kept below their critical mass (for example in the order of $\sqrt{R}$ or $\eta R$ with zero or one Detective vehicle), the system will be able to quickly evict the malicious vehicles and maintain safe and secure communications continuously. Also, the addition of a single infrastructure node can significantly decrease the power of Malicious vehicles.

Establishing a 'white list' of vigilante vehicles, which are known innocent vehicles rather than distributing more "Disregard" messages or CRLs is a more effective approach to increase the chance of winning for the Innocents.

Furthermore, the suicide of the Detective is particularly powerful, as opposed to the solitary act considered in other mechanisms. This solitary sacrifice is one interpretation of the elimination process after majority vote, which bypasses the need to model false decision probabilities.

With one Detective vehicle, the optimal game for the Innocent vehicles will be the following:

Suppose there is a single Detective vehicle. Referring to FIG. 3, during the first $\sqrt{\eta R}$ rounds, the detective collects information about vehicles at random 300. The other Innocents vote in each round to eliminate a vehicle at random. After $\sqrt{\eta R}$ rounds, the Detective compiles a list V of so-called "Vigilante" vehicles that are vehicles known to be Innocents 302. At this stage, the number of Vigilantes |V| should be larger than the number of Malicious (Mafia) vehicles |M| (since for $\sqrt{\eta} \ge \eta$ for $0 < \eta < 1$). The group of Vigilantes acts as an "anti-Mafia". The Detective encrypts the list of Vigilantes, and sends the encrypted list to each member of V so that the Vigilantes know which vehicles are also Vigilantes 304. The Detective then asks everyone to eliminate him. Upon being eliminated, the identity of the Detective is revealed, and therefore each Vigilante knows that the messages and encrypted list they have received is genuine.

Once the detective is evicted, in each round, the highest ranking (numbered) member of V selects a member outside of V to be eliminated, and communicates to the other members of V the identity of the vehicle to be eliminated, say p. All Innocent vehicles abstain from voting in a secure anonymous vote to coordinate/select the next vehicle p to eliminate. After this pre communication round, every non-Mafia vehicle sends a 'Disregard-p' message.

This shows that a single Detective vehicle can significantly increase the number of Malicious vehicles needed to dominate the game to $\eta R$, $0<\eta<1$ from $\sqrt{R}$.

Therefore, an enhanced malicious vehicle detection and eviction method is as followings:

[1]. Consider an arbitrary geographical region.

[2]. Time is divided into time periods of equal or variable lengths.

[3]. For each time period:

a. The Resident vehicles in the region pick one vehicle to eliminate by majority vote. Each Resident vehicle picks one vehicle it wants to eliminate and sends out its vote in a message to other vehicles. The vehicle receiving the most votes is eliminated. In case of a tie, a vehicle is chosen uniformly at random from the vehicles receiving the maximum number of votes. The identity of the eliminated vehicle is revealed publicly via dissemination of a "Disregard" message. If the eliminated vehicle is a Detective vehicle, this fact is revealed as well.

b. For each time period T: Each Detective vehicle acquires the "Malicious" or "Innocent" status of a single randomly selected vehicle. This status is then revealed only to the Detective vehicles. Here, the Detective vehicle may collect messages from other vehicles and may communicate with infrastructure-based servers to help determine whether another vehicle is malicious or not.

[4]. During the first $\sqrt{\eta R}$ time periods (rounds), the Detective vehicle compiles and maintains an up to date "white list" V of "Vigilante" vehicles. At this stage, the number of Vigilantes |V| should be larger than the number of Malicious vehicles |M| (since $\sqrt{\eta}>\eta$ for $0<\eta<1$). The Detective vehicle encrypts the white list of Vigilantes and sends the encrypted list to each member of V so that the Vigilante vehicles know which other vehicles are also vigilantes. The Detective vehicle then asks other vehicles to eliminate itself by sending out a "Disregard" message revealing its own identity. Upon being eliminated, the identity of the detective is revealed, and therefore each Vigilante vehicles know that the messages and encrypted list white list" they have received is genuine.

[5]. Once the Detective vehicle is evicted, the white list of Vigilante vehicles is known to be genuine, and can be acted upon. In each time period (round), the highest ranking (numbered) member of V selects a member outside of V to be eliminated by sending a "Disregard" message to all vehicles in V. All innocent vehicles abstain from voting in a secure anonymous vote to coordinate on the next vehicle p to eliminate. All Vigilante vehicles vote for p. After this round, all vehicles vote for p in the majority vote, and 'Disregard-p' messages are sent. This shows that a single Detective vehicle to significantly increase the number of malicious vehicles needed to dominate the game to $\eta R$, $0<\eta<1$ from $\sqrt{R}$.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a system and method for detecting and evicting malicious vehicles in a vehicle communication network, it will be apparent to those skilled in the art that modifications and variations are possible without deviating from the principles and broad teachings of the present invention which shall be limited solely by the scope of the claims appended hereto.

What is claimed is:

1. A computer program product for detecting a malicious vehicle, the computer program product comprising:
   a computer readable storage medium readable by a processor and storing instructions for execution by the at least one processor for performing a method comprising:
   selecting, by the processor, for each sub-period of a predefined time period, a target vehicle from a plurality of vehicles,
      wherein the processor is a processor of a detective vehicle,
      wherein the plurality of vehicles and the detective vehicle are within a vehicle-to-vehicle communication range, and
      wherein vehicle-to-vehicle communication does not utilize infrastructure network connectivity;
   based on the selecting, obtaining, by the processor, messages regarding a status of the target vehicle from at least one of: a group of vehicles from the plurality of vehicles, or an infrastructure-based server accessible to the target vehicle via a network connection, wherein the detective vehicle and each vehicle of the plurality of vehicles has a sporadic connection or no connection to the infrastructure-based server;
   based on obtaining the messages, determining, by the processor, the status of the target vehicle, wherein the status is one of: malicious or innocent,
wherein a vehicle with a malicious status sends erroneous messages to the plurality of vehicles, and
wherein a vehicle with an innocent status sends correct messages to the plurality of vehicles
based on determining that the status of the target vehicle is innocent, retaining an identifier of the target vehicle on a list comprising identifiers of vehicles determined by the processor to have the innocent status; and
based on the predefined time period elapsing, providing, by the processor, the list to the vehicles associated with the identifiers on the list.

2. The computer program product of claim 1, further comprising:
obtaining, by a processor of a first vehicle of the plurality of vehicles, a message from a second vehicle of the plurality of vehicles, wherein an identifier associated with the first vehicle is on the list, and wherein an identifier associated with the second vehicle is not on the list;
obtaining, by the processor of the first vehicle, the list;
based on the obtaining of the list and the obtaining of the message, selecting, by the processor of a the first vehicle, during a sub-period of a second predefined time period, the second vehicle; and
after obtaining the list, rejecting, by the processor of the first vehicle, further communications sent by the detective vehicle.

3. The computer program product of claim 1, further comprising:
providing, by the processor, a communication to the vehicles associated with the identifiers on the list, wherein the communication comprises identifying the detective vehicle as a detective vehicle.

4. The computer program product of claim 1, wherein the predefined time period comprises $\sqrt{\eta R}$ sub-periods, wherein R comprises a total number of vehicles of the plurality of vehicles in and $\eta$ comprises a constant value between 0 and 1, and wherein, for each sub-period, the list is updated by the detective vehicle.

5. The computer program product of claim 1, further comprising:
prior to the providing, encrypting, by the processor, the list, wherein the vehicles associated with the identifiers on the list can decrypt the list with certificates; and
providing, by the processor, a request to the vehicles associated with the identifiers on the list to reject future communications from the detective vehicle for a specified time period.

6. The computer program product of claim 2, further comprising:
based on selecting, obtaining, by the processor of the first vehicle, messages regarding a status of the second vehicle from the vehicles associated with the identifiers on the list; and
based on obtaining the messages, determining that the status of the second vehicle is malicious and rejecting future vehicle-to-vehicle communications from the second vehicle for a specified time period; and
notifying, by the processor of the first vehicle, the vehicles associated with the identifiers on the list, that the status of the second vehicle is malicious.

7. The computer program product of claim 1, wherein the providing comprises providing the list to a first vehicle of the plurality of vehicles, wherein an identifier associated with the first vehicle is on the list, the method further comprising:
sending, by the processor, a vehicle-to-vehicle communication to the first vehicle after the providing; and
subsequent to the sending, obtaining, by the processor, a rejection from the first vehicle of the vehicle-to-vehicle communication from the detective vehicle.

8. The computer program product of claim 7, further comprising:
subsequent to a specified time period, sending, by the processor, a second vehicle-to-vehicle communication to the first vehicle; and
subsequent to the sending, obtaining, by the processor, an acceptance from the first vehicle of a the second vehicle-to-vehicle communications from the detective vehicle.

9. The computer program product of claim 2, wherein at least one of the detective vehicle, the first vehicle, or the second vehicle is an unmanned aerial vehicle.

10. A computer system for detecting a malicious vehicle, the computer system comprising:
a memory; and
a processor in communications with the memory, wherein the computer system is configured to perform a method, the method comprising:
selecting, by the processor, for each sub-period of a predefined time period, a target vehicle from a plurality of vehicles,
wherein the processor is a processor of a detective vehicle,
wherein the plurality of vehicles and the detective vehicle are within a vehicle-to-vehicle communication range, and
wherein vehicle-to-vehicle communication does not utilize infrastructure network connectivity;
based on the selecting, obtaining, by the processor, messages regarding a status of the target vehicle from at least one of: a group of vehicles from the plurality of vehicles, or an infrastructure-based server accessible to the target vehicle via a network connection, wherein the detective vehicle and each vehicle of the plurality of vehicles has a sporadic connection or no connection to the infrastructure-based server;
based on obtaining the messages, determining, by the processor, the status of the target vehicle,
wherein the status is one of: malicious or innocent,
wherein a vehicle with a malicious status sends erroneous messages to the plurality of vehicles, and
wherein a vehicle with an innocent status sends correct messages to the plurality of vehicles
based on determining that the status of the target vehicle is innocent, retaining an identifier of the target vehicle on a list comprising identifiers of vehicles determined by the processor to have the innocent status; and
based on the predefined time period elapsing, providing, by the processor, the list to the vehicles associated with the identifiers on the list.

11. The computer system of claim 10, further comprising:
a second memory; and
a second processor in communications with the second memory, wherein the computer system is configured to perform a method, the method comprising:
obtaining, by the second processor, a message from a second vehicle of the plurality of vehicles,
wherein the second processor is a processor of a first vehicle of the plurality of vehicles, wherein an identifier associated with the first vehicle is on the list, and wherein an identifier associated with the second vehicle is not on the list;

obtaining, by the second processor, the list;

based on the obtaining of the list and the obtaining of the message, selecting, by the second processor, during a sub-period of a second predefined time period, the second vehicle; and after obtaining the list, rejecting, by the second processor, further communications sent by the detective vehicle.

12. The computer system of claim 10, further comprising:

providing, by the processor, a communication to the vehicles associated with the identifiers on the list, wherein the communication comprises identifying the detective vehicle as a detective vehicle.

13. The computer system of claim 10, wherein the predefined time period comprises $\sqrt{\eta R}$ sub-periods, wherein R comprises a total number of vehicles of the plurality of vehicles in and $\eta$ comprises a constant value between 0 and 1, and wherein, for each sub-period, the list is updated by the detective vehicle.

14. The computer system of claim 10, further comprising:

prior to the providing, encrypting, by the processor, the list, wherein the vehicles associated with the identifiers on the list can decrypt the list with certificates; and providing, by the processor, a request to the vehicles associated with the identifiers on the list to reject future communications from the detective vehicle for a specified time period.

15. The computer system of claim 11, further comprising:

based on selecting, obtaining, by the second processor, messages regarding a status of the second vehicle from the vehicles associated with the identifiers on the list; and based on obtaining the messages, determining that the status of the second vehicle is malicious and rejecting future vehicle-to-vehicle communications from the second vehicle for a specified time period; and notifying, by the processor of the first vehicle, the vehicles associated with the identifiers on the list, that the status of the second vehicle is malicious.

16. The computer system of claim 10, wherein the providing comprises providing the list to a first vehicle of the plurality of vehicles, wherein an identifier associated with the first vehicle is on the list, the method further comprising:

sending, by the processor, a vehicle-to-vehicle communication to the first vehicle after the providing; and subsequent to the sending, obtaining, by the processor, a rejection from the first vehicle of the vehicle-to-vehicle communication from the detective vehicle.

17. The computer system of claim 16, further comprising:

subsequent to a specified time period, sending, by the processor, a second vehicle-to-vehicle communication to the first vehicle; and subsequent to the sending, obtaining, by the processor, an acceptance from the first vehicle of a the second vehicle-to-vehicle communications from the detective vehicle.

18. The computer system of claim 11, wherein at least one of the detective vehicle, the first vehicle, or the second vehicle is an unmanned aerial vehicle.

19. The computer system of claim 11, wherein the memory and the second memory comprise one of: a single memory or at least two memories.

20. The computer system of claim 11, wherein the processor and the second processor comprise one of: a single processor or at least two processors.

* * * * *